United States Patent
Wilmot, Jr. et al.

(10) Patent No.: US 8,118,257 B2
(45) Date of Patent: Feb. 21, 2012

(54) THERMAL MANAGEMENT SYSTEM WITH STAGED COOLING

(75) Inventors: George Eugene Wilmot, Jr., East Granby, CT (US); Diane G. Drew, Farmington, CT (US); Gregory M. Ott, Feeding Hills, MA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 1128 days.

(21) Appl. No.: 11/413,881

(22) Filed: Apr. 28, 2006

(65) Prior Publication Data

US 2007/0252039 A1 Nov. 1, 2007

(51) Int. Cl.
B64D 13/08 (2006.01)

(52) U.S. Cl. .................................. 244/118.5; 62/239

(58) Field of Classification Search ............... 244/118.5; 62/324.1, 243, 385, 434, 160, 175, 185, 201
See application file for complete search history.

(56) References Cited

U.S. PATENT DOCUMENTS

| | | | | |
|---|---|---|---|---|
| 2,963,879 | A * | 12/1960 | De Paravicini | 62/239 |
| 3,711,044 | A * | 1/1973 | Matulich | 244/118.5 |
| 5,479,983 | A * | 1/1996 | Fischer et al. | 165/205 |
| 5,513,500 | A * | 5/1996 | Fischer et al. | 62/239 |
| 6,216,981 | B1 * | 4/2001 | Helm | 244/118.5 |
| 6,845,627 | B1 | 1/2005 | Buck | |
| 6,880,351 | B2 * | 4/2005 | Simadiris et al. | 62/185 |
| 7,024,874 | B2 * | 4/2006 | Zywiak et al. | 62/199 |
| 7,121,100 | B2 * | 10/2006 | Atkey et al. | 62/86 |
| 7,380,408 | B2 * | 6/2008 | Zywiak et al. | 62/244 |
| 7,523,622 | B2 * | 4/2009 | Zywiak et al. | 62/244 |
| 7,784,289 | B2 * | 8/2010 | Scherer et al. | 62/99 |
| 2001/0032472 | A1 * | 10/2001 | Buchholz et al. | 62/172 |
| 2004/0159118 | A1 * | 8/2004 | Hu | 62/434 |
| 2005/0051668 | A1 * | 3/2005 | Atkey et al. | 244/118.5 |
| 2005/0061012 | A1 | 3/2005 | Zywiak et al. | |
| 2005/0076661 | A1 | 4/2005 | Zywiak et al. | |
| 2005/0210910 | A1 | 9/2005 | Rigney et al. | |
| 2006/0037340 | A1 | 2/2006 | Tien | |
| 2008/0134703 | A1 * | 6/2008 | Scherer et al. | 62/244 |
| 2008/0196442 | A1 * | 8/2008 | Lu | 62/434 |
| 2009/0000328 | A1 * | 1/2009 | Scherer et al. | 62/335 |

FOREIGN PATENT DOCUMENTS

| | | |
|---|---|---|
| DE | 3013518 A1 | 10/1981 |
| DE | 10121035 A1 | 11/2002 |
| EP | 0582479 A | 2/1994 |
| SU | 1394002 A1 | 5/1988 |
| WO | 2005063568 A1 | 7/2005 |
| WO | 2006017899 A1 | 2/2006 |

* cited by examiner

Primary Examiner — Benjamin P Lee
(74) Attorney, Agent, or Firm — Kinney & Lange, P.A.

(57) ABSTRACT

A thermal management system comprises a first heat exchanger having an inlet and an outlet, a second heat exchanger having an inlet and an outlet, a fluid loop, a first heat pump, and a second heat pump. The fluid loop circulates a fluid, and forms a continuous path between the first and second heat exchangers. The first heat pump is connected to the fluid loop and is disposed between the outlet of the second heat exchanger and the inlet of the first heat exchanger. The second heat pump is connected to the fluid loop and is disposed between the outlet of the first heat exchanger and the inlet of the second heat exchanger.

14 Claims, 6 Drawing Sheets

THERMAL MANAGEMENT SYSTEM WITH STAGED COOLING

BACKGROUND

The present invention relates to a thermal management system for use in an aircraft. More particularly, the present invention relates to a thermal management system configured to distribute heating or cooling between a plurality of heat pump units.

A typical commercial aircraft includes at least several non-integrated cooling systems configured to provide temperature control to various regions of the aircraft. For example, an aircraft cooling system primarily provides heating and cooling for the aircraft cabin area. In addition, a galley chiller system is dedicated to refrigerating the food carts in the galleys located throughout the aircraft. Since each system has a significant weight and power requirement, the overall efficiency of the aircraft is affected by these nonintegrated systems.

Typically, aircraft cooling systems are standalone vapor cycle units. The vapor cycle units generally include a compressor pumping a refrigerant to a condenser, which rejects heat from the compressed refrigerant to the surrounding environment. The refrigerant from the condenser is regulated through an expansion valve to an evaporator where the refrigerant expands to cool the fluid. The refrigerant within the evaporator absorbs heat from the surrounding environment. After absorbing heat, the refrigerant flows from the evaporator to the compressor where the cycle repeats. Since each vapor cycle unit is dedicated to one region of the aircraft, a typical aircraft requires many of these units to meet its cooling demands.

In other types of aircraft, one or more vapor cycle units are positioned at one centralized location in the aircraft rather than having separate units dedicated to providing temperature control to one specific region. These vapor cycle units cool the refrigerant, pump the refrigerant to various locations throughout the aircraft that require cooling, and then direct all of the refrigerant back to the centralized vapor unit location. Thus, all the cooling of the refrigerant is performed at one location. Since the cooling is performed at one centralized location, the vapor cycle units are typically large, heavy, and utilize a significant amount of refrigerant, thus increasing the weight of the aircraft and decreasing aircraft efficiency.

Thus, there exists a need for a thermal management system that is capable of meeting climate control requirements with increased efficiency.

BRIEF SUMMARY

The present invention is a thermal management system comprising a first heat exchanger having an inlet and an outlet, a second heat exchanger having an inlet and an outlet, a fluid loop, a first heat pump, and a second heat pump. The fluid loop circulates a fluid, and forms a continuous path between the first and second heat exchangers. The first heat pump is connected to the fluid loop and is disposed between the outlet of the second heat exchanger and the inlet of the first heat exchanger. The second heat pump is connected to the fluid loop and is disposed between the outlet of the first heat exchanger and the inlet of the second heat exchanger.

DETAILED DESCRIPTION

Figure 1:
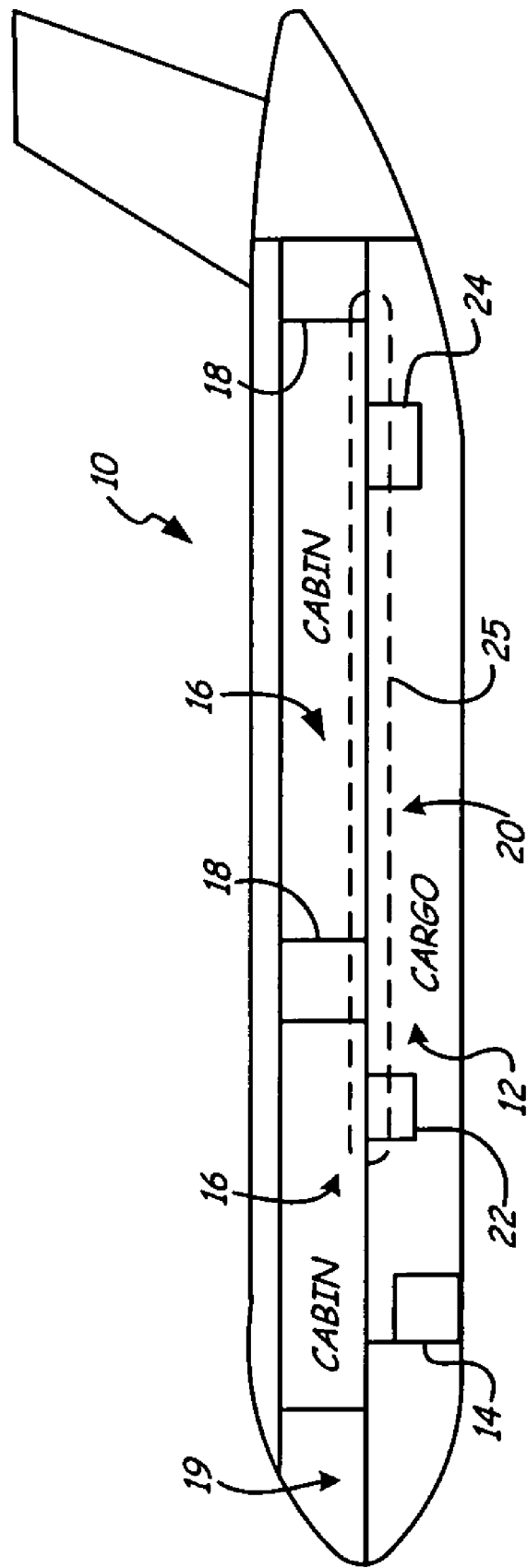
FIG. 1 is a schematic cross-sectional view of a commercial aircraft.

A high level schematic cross-sectional view of an aircraft 10 is shown in FIG. 1. Aircraft 10 can include a first area 12 such as a cargo area, a second area 14 such as an electronics power bay, a third area 16 such as a cabin area, galleys 18, cockpit 19, and thermal management system 20. Different layouts of the aircraft 10, however, are also possible. As shown in FIG. 1, thermal management system 20 includes first heat pump unit 22, second heat pump unit 24, and fluid loop 25.

In FIG. 1, fluid loop 25 extends through portions of cargo area 12 and cabin area 16, although fluid loop 25 may extend through other portions of aircraft 10, such as above cabin area 16, without departing from the scope of the present invention. In particular, thermal management system 20 may be configured to provide climate control for any climate controlled region on an aircraft including, but not limited to, cargo area 12, electronics power bay 14, galleys 16, cabin area 18, and cockpit 19.

Thermal management system 20 circulates a fluid through fluid loop 25 to provide a source of heating or cooling to various climate controlled regions of aircraft 10. The fluid may be, for example, a liquid such as water, or a gas such as air. However, any fluid that may be configured to provide heating or cooling to a thermal management system is within the intended scope of the present invention.

Although thermal management system 20 may be configured to provide heating, cooling, or a combination of the two within the same system, the following discussion will focus on a thermal management system that only provides cooling. Nevertheless, it should be understood that the heat pump units may also provide warm fluid to regions that require heating instead of cooling.

Figure 2:
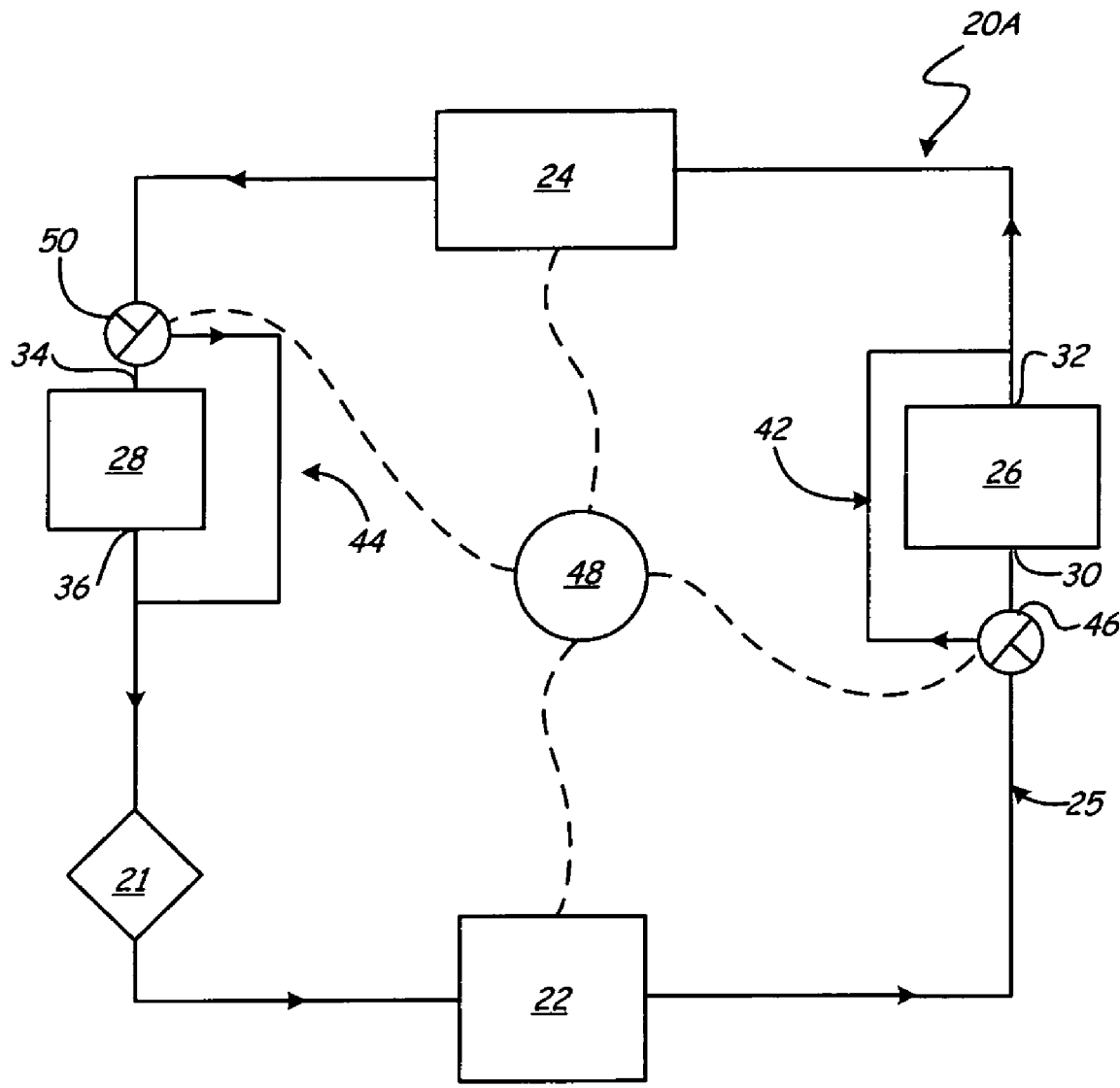
FIG. 2 is a schematic diagram of a first embodiment of a thermal management system according to the present invention.

FIG. 2 is a schematic diagram of one embodiment of a thermal management system 20A, which includes fluid transfer device 21, first heat pump unit 22, second heat pump unit 24, first climate controlled region 26, and second climate controlled region 28. As shown in FIG. 2, first climate controlled region 26 has inlet 30 and outlet 32. Similarly, second climate controlled region 28 has inlet 34 and outlet 36. First heat pump unit 22, second heat pump unit 24, first climate controlled region 26, and second climate controlled region 28 are fluidly connected by fluid loop 25.

As shown in FIG. 2, first heat pump unit 22 is disposed between outlet 36 of second climate controlled region 28 and inlet 30 of first climate controlled region 26. Second heat pump unit 24 is disposed between outlet 32 of first climate controlled region 26 and inlet 34 of second climate controlled region 28. As a result of their positions between climate controlled regions, first and second heat pump units 26 and 28 are configured to provide staged climate control in thermal management system 20A.

Fluid transfer device 21 may include a pump, a fan, or any other component capable of circulating the fluid throughout fluid loop 25. As the fluid is circulated through fluid loop 25, it is first cooled to a desired temperature within heat pump unit 22 before flowing through inlet 30 of first climate controlled region 26. As the fluid flows through first climate controlled region 26, the fluid is heated as it absorbs heat from and provides cooling to first climate controlled region 26. The fluid exits first climate controlled region 26 through outlet 32 and is once again cooled to a desired temperature in second heat pump unit 24 before flowing through inlet 34 of second climate controlled region 28. As the fluid flows through second climate controlled region 28, the fluid is heated as it absorbs heat from and provides cooling to second climate controlled region 28. The fluid then exits second climate controlled region 28 through outlet 36, and the cycle repeats. Since the cooling is distributed between a plurality of heat pump units, the thermal management system has the ability to maintain a substantially constant supply temperature at the climate controlled regions, thus reducing the total amount of fluid necessary to provide cooling within an aircraft.

Thermal management system 20A also includes first fluid bypass 42 and second fluid bypass 44. First fluid bypass 42 begins at a point upstream of inlet 30 and ends at a point downstream of outlet 32, and is configured to allow fluid flowing out of first heat pump unit 22 to bypass first climate controlled region 26. First fluid bypass 42 is controlled by control valve 46. Control valve 46 meters the flow of fluid into first climate controlled region 26. The amount of fluid entering first climate controlled region 26 corresponds with the amount of cooling necessary in first climate controlled region 26. That is, generally, the more fluid entering first climate controlled region 26, the more cooling that is provided within first climate controlled region 26. A controller 48 coordinates the operation of control valve 46 based upon, for example, a temperature sensor disposed within first climate controlled region 26. In one embodiment, the temperature sensor may measure the temperature at inlet 30 of first climate controlled region 26, and controller 48 may determine the amount of fluid necessary to flow through first climate controlled region 26 to ensure that first climate controlled region 26 is cooled to the desired temperature.

Second fluid bypass 44, which operates similar to first fluid bypass 42, begins at a point upstream of inlet 34 and ends at a point downstream of outlet 36. Second fluid bypass 44 is controlled by control valve 50, which meters the flow of fluid into second climate controlled region 28. In addition to coordinating the operation of control valve 46, controller 48 also coordinates the operation of control valve 50 based upon, for example, a similar temperature sensor located within second climate controlled region 28.

As shown in FIG. 2, there are two heat pump units and two climate controlled regions that alternate along fluid loop 25. Thus, in thermal management system 20A, there is a heat pump unit positioned along fluid loop 25 prior to the inlet of each climate controlled region that is dedicated to cooling the fluid to the temperature required by its respective climate controlled region. However, as will be shown in the following figures, an equal number of heat pump units and climate controlled regions is not a necessary component of the present invention. Furthermore, although thermal management system 20A includes two heat pump units and two climate controlled regions, additional heat pump units and climate controlled regions may be added without departing from the spirit and scope of the present invention. In addition, although thermal management system 20A depicts a system with alternating heat pump units and temperature controlled regions, systems that do not follow this alternating pattern are also within the intended scope of the present invention.

There are many benefits to a thermal management system for an aircraft that incorporates staged cooling. First, since the cooling of the fluid is distributed between several heat pump units, staged cooling allows for a more constant supply temperature at the climate controlled regions. In other words, the system may operate in such a manner that the temperature of the fluid prior to entering each climate controlled region is substantially equivalent. Second, since the fluid is cooled in between climate controlled regions, a smaller amount of fluid may be used to meet the required cooling demands. A smaller amount of fluid means less total aircraft weight, which is desirable in order to increase the overall efficiency of the aircraft. Third, since a staged cooling system involves numerous separate heat pump units instead of one main heat pump unit, each separate heat pump unit may be smaller in size and weight. As a result, installation and removal of the thermal management system is much easier. It is important to note that these are just a few of the benefits provided by the thermal management system of the present invention, and are presented for purposes of example only.

Figure 3:
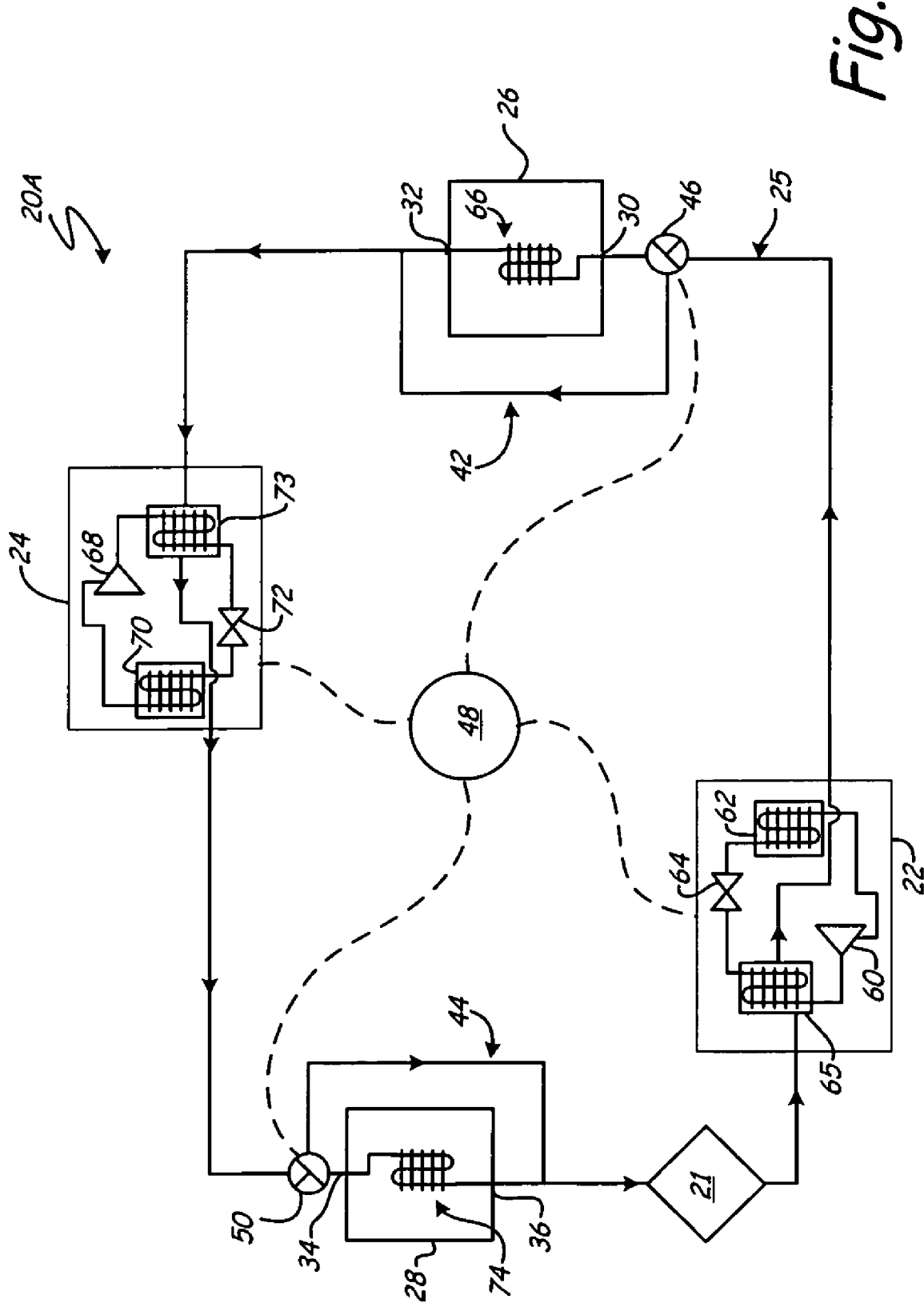
FIG. 3 is another schematic diagram of the thermal management system of FIG. 2 showing one embodiment of a heat pump unit.

FIG. 3 is a more detailed schematic diagram of thermal management system 20A. As shown in FIG. 3, first heat pump unit 22 includes compressor 60, condenser 62, expansion valve 64, and evaporator 65, while first climate controlled region 26 includes heat exchanger 66. Compressor 60 compresses and pumps a refrigerant fluid to condenser 62, where heat from the compressed fluid within condenser 62 is rejected to the surrounding environment. The refrigerant then flows through expansion valve 64, thereby expanding the refrigerant. Expansion valve 64 controls automatically to a desired superheat setpoint. Finally, the refrigerant is evaporated in evaporator 66 before being directed back to compressor 60, where the vapor cycle repeats. Although heat pump unit 22 is described in reference to a vapor compression cycle, it should be understood that heat pump units involving other types of cycles and utilizing different components are also within the intended scope of the present invention.

As shown in FIG. 3, fluid loop 25 flows past evaporator 65 in such a way that heat from the fluid is absorbed by the refrigerant in evaporator 65, thus providing a source of cooling to the fluid. After the fluid in fluid loop 25 is cooled by evaporator 65, the fluid exits first heat pump unit 22 at low temperature and flows toward heat exchanger 66. In heat exchanger 66, the cool fluid absorbs heat from first climate controlled region 26. As a result of this exchange of heat, first climate controlled region 26 is cooled, while the fluid flowing through heat exchanger 66 is heated.

As shown in FIG. 3, second heat pump unit 24 includes compressor 68, condenser 70, expansion valve 72, and evaporator 73, while second climate controlled region 28 includes heat exchanger 74. Second heat pump unit 24 operates similar to first heat pump unit 22 described above. However, second heat pump unit 24 is configured to cool the fluid in fluid loop 25 prior to the fluid flowing through second climate controlled region 28 instead.

Controller 48 may also be connected to first and second heat pump units 22 and 24 in order to control the temperature of the fluid exiting the heat pumps. In particular, controller 48 may be configured to control the displacement of compressors 60 and 68 or the pressure drop within expansion valves 64 and 72. As a result, the heat transfer within evaporators 65 and 73 (and thus, the temperature of the fluid exiting heat pump units 22 and 24) may be adjusted.

Figure 4:
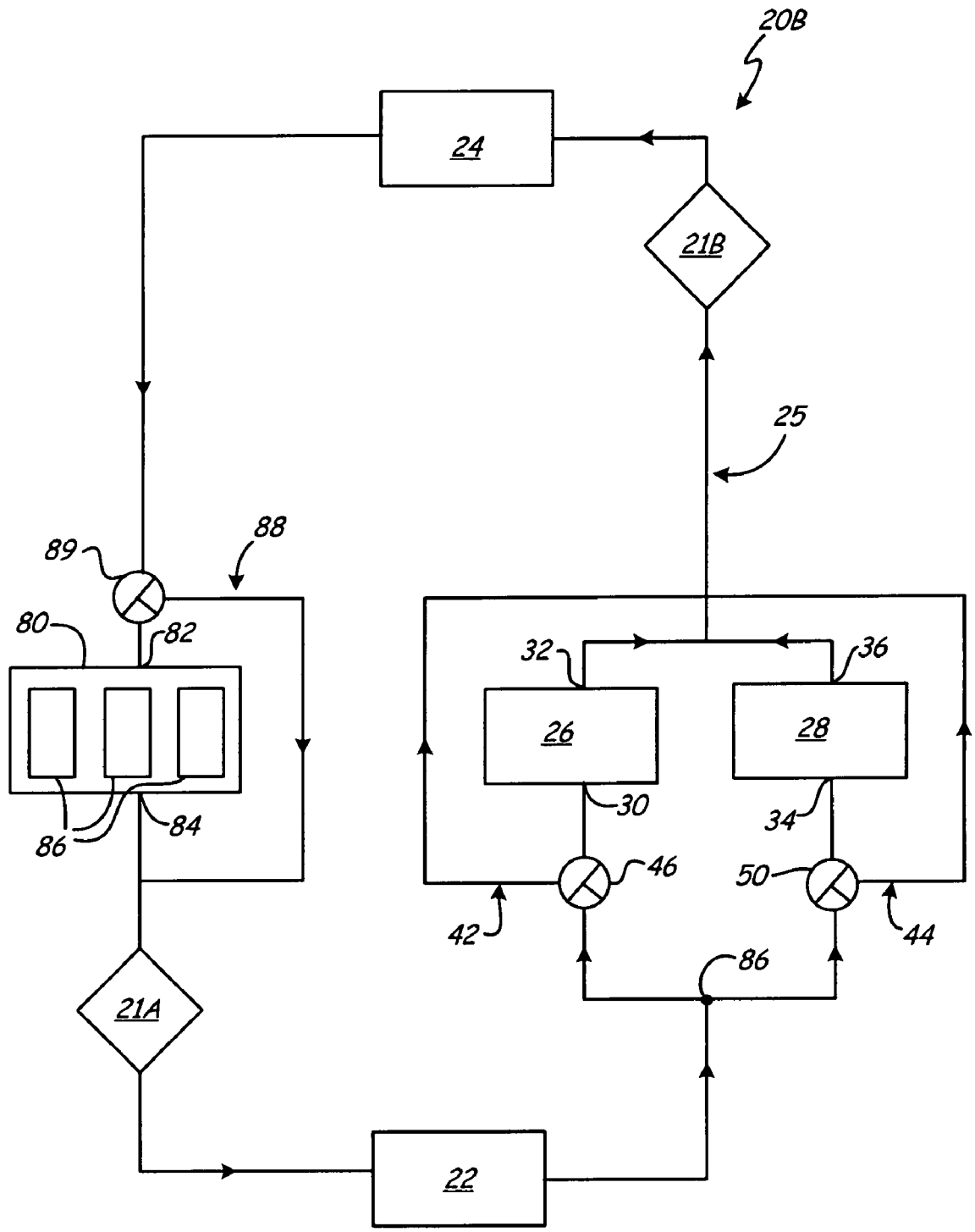
FIG. 4 is a schematic diagram of a second embodiment of a thermal management system according to the present invention.

FIG. 4 is a schematic diagram of an additional embodiment of a thermal management system 20B, which includes first fluid transfer device 21A, second fluid transfer device 21B, first heat pump unit 22, second heat pump unit 24, first climate controlled region 26, second climate controlled region 28, and third climate controlled region 80. As shown in FIG. 4, first climate controlled region 26 has inlet 30 and outlet 32, second climate controlled region 28 has inlet 34 and outlet 36, and third climate controlled region 80 has inlet 82 and outlet 84. In addition, third climate controlled region 80 includes a plurality of load modules 86. First and second fluid transfer devices 21A and 21B are configured to circulate the fluid throughout fluid loop 25. It is important to note that the number and position of fluid transfer devices within a thermal management system may be varied to optimize the efficiency of the system. Thus, a thermal management system with any number of fluid transfer devices is contemplated.

In FIG. 4, first, second, and third climate controlled regions 26, 28, and 80 are connected by fluid loop 25. In particular, first and second climate controlled regions 26 and 28 are connected in parallel with each other, and in series with third climate controlled region 80. First heat pump unit 22 is disposed along fluid loop 25 between outlet 84 of third climate controlled region 80 and inlets 30 and 34 of first and second climate controlled regions 26 and 28, respectively. Furthermore, second heat pump unit 24 is disposed along fluid loop 25 between outlets 32 and 36 of first and second climate controlled regions 26 and 28, respectively, and inlet 82 of third climate controlled region 80. Therefore, as shown in FIG. 4, the thermal management system of the present invention may include climate controlled regions connected both in parallel and in series. As a result of their positions between climate controlled regions, first and second heat pump units 26 and 28 are configured to provide staged climate control in thermal management system 20B.

As the fluid is circulated through fluid loop 25, it is first cooled to a desired temperature within heat pump unit 22 before reaching splitter 86. A first portion of the fluid is directed through inlet 30 of first climate controlled region 26. As the first portion of fluid flows through first climate controlled region 26, the fluid is heated as it absorbs heat from and provides cooling to first climate controlled region 26. The first portion of fluid exits first climate controlled region 26 through outlet 32. A second portion of the fluid is directed through inlet 34 of second climate controlled region 28. As the second portion of the fluid flows through second climate controlled region 28, the fluid is heated as it absorbs heat from and provides cooling to second climate controlled region 28. The second portion of the fluid exits second climate controlled region 28 through outlet 36, where it meets up with the first portion of the fluid before it flows toward second heat pump unit 24. The fluid is once again cooled to a desired temperature in second heat pump unit 24 before flowing through inlet 82 of third climate controlled region 80. Inside third climate controlled region 80, the fluid flows through load modules 86. As the fluid flows through load modules 86, the fluid is heated as it absorbs heat from and provides cooling to load modules 86. The fluid then exits third climate controlled region 80 through outlet 84, and the cycle repeats.

Load modules 86 are typically individual units within a climate controlled region that require cooling. For example, if third climate controlled region 80 is a galley on an aircraft, then load modules 86 may be individual galley carts. In one embodiment of third climate controlled region 80, each of load modules 86 may include a heat exchanger such as heat exchangers 66 or 74 described above in reference to thermal management system 20A of FIG. 3.

Thermal management system 20B also includes first fluid bypass 42, second fluid bypass 44, and third fluid bypass 88. Third fluid bypass operates similar to first and second fluid bypasses 42 and 44 as described above in reference to FIG. 2, and is controlled by control valve 89. In addition, although not shown in FIG. 4, thermal management system 20B includes a controller similar to controller 48 of FIG. 2 to coordinate the operation of control valve 89 based upon, for example, a temperature sensor disposed within third climate controlled region 80.

As shown in FIG. 4, there are two heat pump units 22, 24 and three climate controlled regions 26, 28, and 80 along fluid loop 25. Thus, as shown in thermal management system 20B, an equal number of heat pump units and climate controlled regions is not necessary to achieve the staged cooling effect of the present invention.

Figure 5:
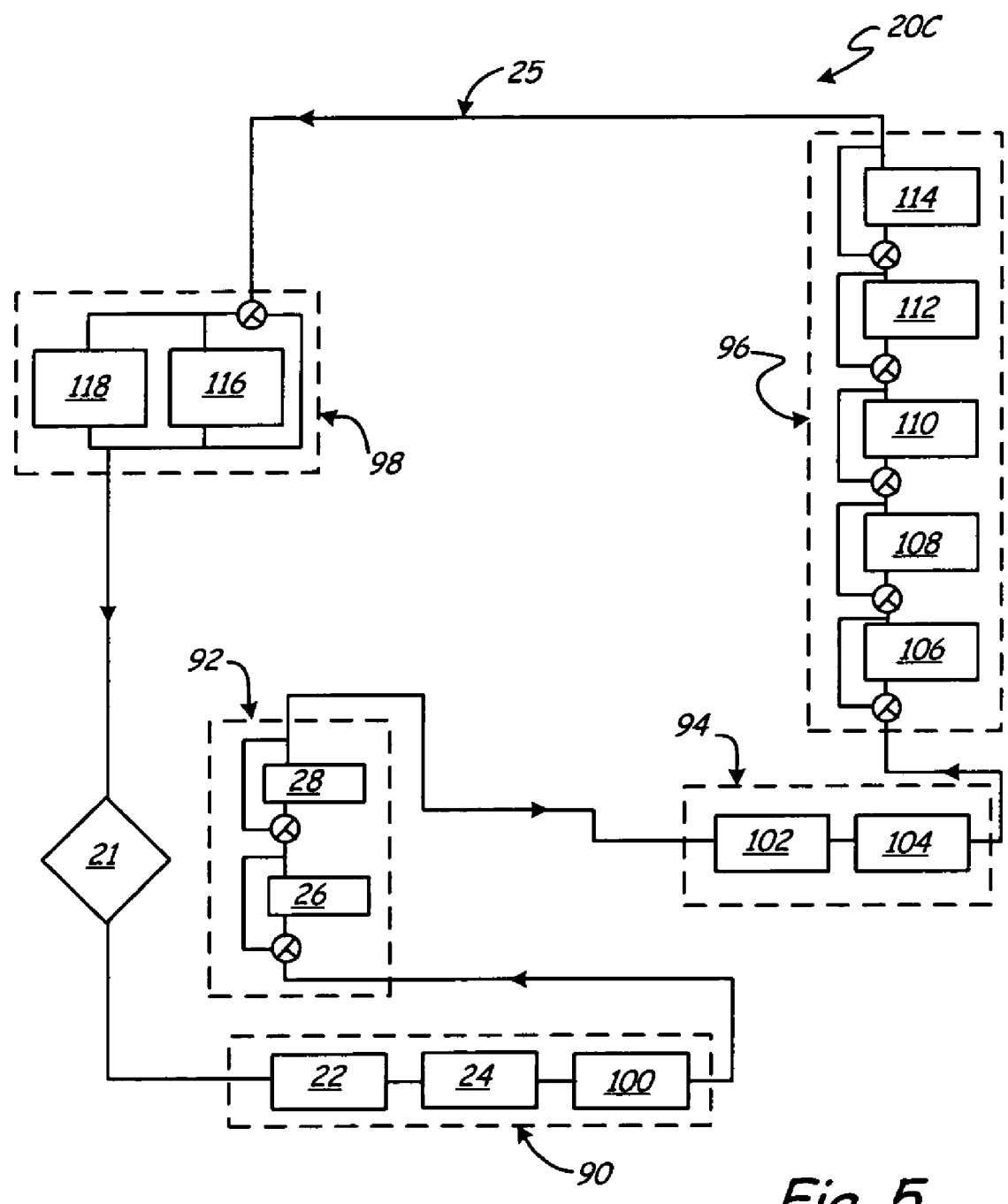
FIG. 5 is a schematic diagram of a third embodiment of a thermal management system according to the present invention.

FIG. 5 is a schematic diagram of an additional embodiment of a thermal management system 20C, which includes fluid transfer device 21, first heat pump system 90, first plurality of climate controlled regions 92, second heat pump system 94, second plurality of climate controlled regions 96, and third plurality of climate controlled regions 98. First heat pump system 90 includes first heat pump unit 22, second heat pump unit 24, and third heat pump unit 100. First plurality of climate controlled regions 92 includes first climate controlled region 26 and second climate controlled region 28. Second heat pump system 94 includes fourth heat pump unit 102 and fifth heat pump unit 104. Second plurality of climate controlled regions includes third climate controlled region 106, fourth climate controlled region 108, fifth climate controlled region 110, sixth climate controlled region 112, and seventh climate controlled region 114. Finally, third plurality of climate controlled regions 98 includes eighth climate controlled region 116 and ninth climate controlled region 118.

In FIG. 5, the first, second, and third pluralities of climate controlled regions 92, 96, and 98 are all connected by fluid loop 25. First heat pump system 90 is disposed along fluid loop 25 between third plurality of climate controlled regions 98 and first plurality of climate controlled regions 92. Furthermore, second heat pump system 94 is disposed along fluid loop 25 between first plurality of climate controlled regions 92 and second plurality of climate controlled regions 96. As a result of their positions between climate controlled regions, first heat pump system 90 and second heat pump system 94 are configured to provide staged climate control in thermal management system 20C.

As the fluid is circulated through fluid loop 25, it is first cooled to a desired temperature within first heat pump system 90. As a result of placing first, second, and third heat pump units in series, first heat pump system 90 may cool the fluid to a very low temperature prior to directing the fluid into the first plurality of climate controlled regions 92. Cooling the fluid to a very low temperature may be necessary to satisfy a climate controlled region that requires a large amount of cooling. As the fluid flows through first plurality of climate controlled regions 92, the fluid is heated as it absorbs heat from and provides cooling to first climate controlled region 26 and second climate controlled region 28. The fluid exits first plurality of climate controlled regions 92 and flows into second heat pump system 94 where it is once again cooled to a desired temperature before flowing toward second plurality of climate controlled regions 96 and third plurality of climate controlled regions 98. As the fluid flows through second plurality of climate controlled regions 96 and third plurality of climate controlled regions 98, the fluid is heated as it absorbs heat from and provides cooling to the various climate controlled regions. The fluid then exits third plurality of climate controlled regions 98, and the cycle repeats.

As shown in FIG. 5, there is not a heat pump system disposed along fluid loop 25 between second plurality of climate controlled regions 96 and third plurality of climate controlled regions 98. Assuming that the fluid exiting second plurality of climate controlled regions 96 is cool enough to meet the cooling demands of third plurality of climate controlled regions 98, it is not necessary to provide staged cooling in between these regions. In particular, the thermal management system of the present invention is "modular," meaning that heat pump units may be added or subtracted from the system in order to tailor the system to the exact requirements of any aircraft.

Figure 6:
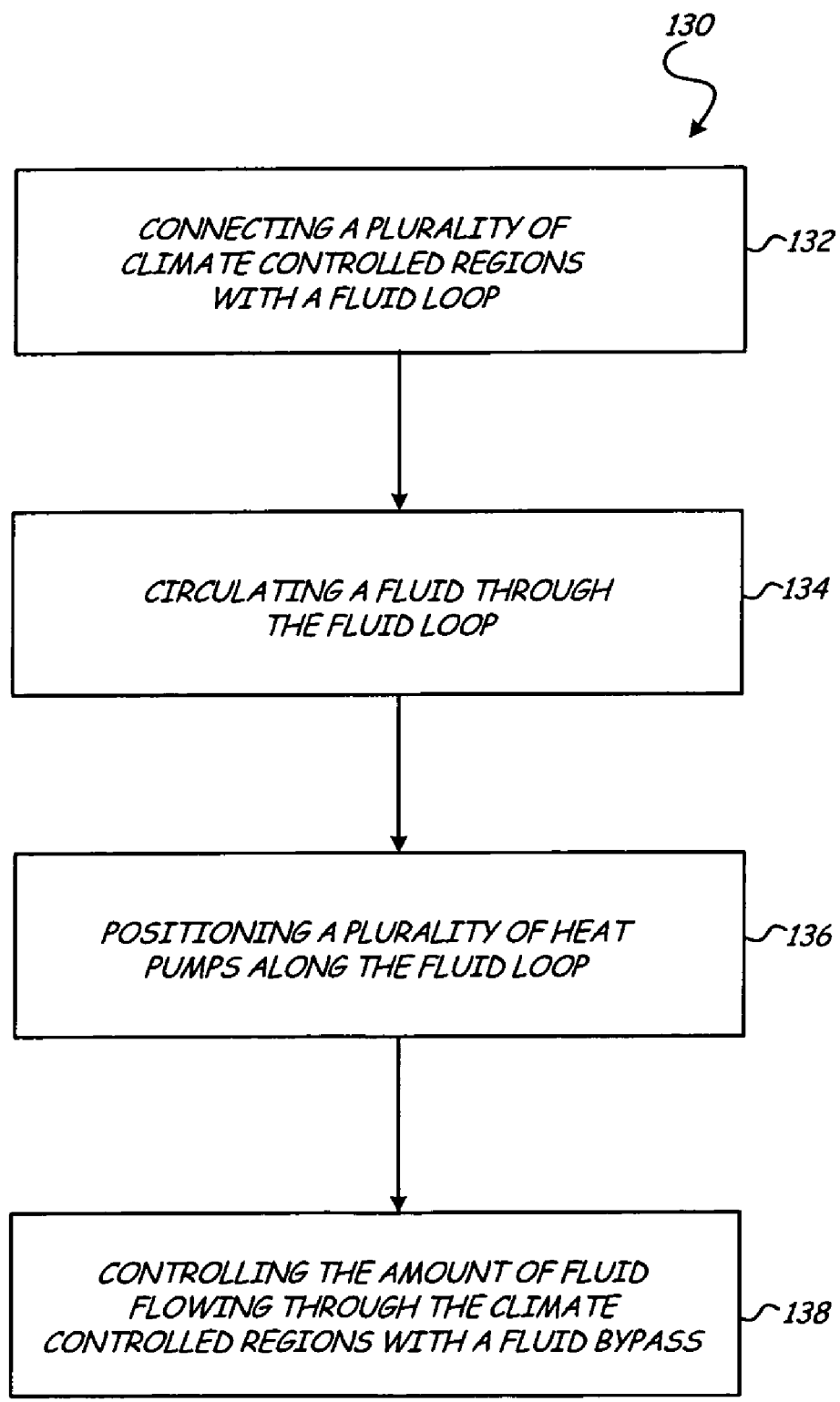
FIG. 6 is a process flow diagram illustrating the steps executed in performing staged heating or cooling according to the present invention.

FIG. 6 is a flowchart of a heating or cooling method 130 according to the present invention. For purposes of example, method 130 will now be described with reference to thermal management system 20A shown and described above in FIG. 2. Method 130 begins at step 132 by connecting a plurality of climate controlled regions, such as first climate controlled region 26 and second climate controlled region 28, together with a fluid loop, such as fluid loop 25. Method 130 continues at step 134 where a fluid is circulated through the fluid loop. The fluid circulating through the fluid loop is configured to provide a source of heating or cooling for the climate controlled regions connected to the fluid loop. Next, in step 136, a plurality of heat pump units are positioned along the fluid loop between the climate controlled regions, such as first heat pump unit 22 and second heat pump unit 24. The heat pump units are configured to heat or cool the fluid at a plurality of different locations along the fluid loop to provide staged climate control in the system. Finally, in step 138, the amount of fluid flowing through the climate controlled regions is controlled with a fluid bypass, such as fluid bypasses 42 and 44.

Although the present invention has been described in reference to various embodiments, it should be understood that thermal management systems 20A, 20B, and 20C are only three possible embodiments of a thermal management system of the present invention, and are shown for purposes of example and not limitation. Furthermore, although thermal management systems 20A, 20B, and 20C are shown as including a single fluid loop, embodiments having multiple fluid loops are also within the intended scope of the present invention.

The terminology used herein is for the purpose of description, and not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

The invention claimed is:

1. A thermal management system for an aircraft having first and second climate controlled regions each with an inlet and an outlet, said system comprising:
 a fluid loop for circulating a fluid, wherein the fluid loop forms a continuous path between the first and second climate controlled regions of the aircraft;
 a first heat pump system connected to the fluid loop and disposed between the outlet of the second climate controlled region and the inlet of the first climate controlled region;
 a second heat pump system connected to the fluid loop and disposed between the outlet of the first climate controlled region and the inlet of the second climate controlled region;
 a first fluid bypass configured to allow a first portion of the fluid flowing through the fluid loop to bypass the first climate controlled region;
 a second fluid bypass configured to allow a second portion of the fluid flowing through the fluid loop to bypass the second climate controlled region;
 a first bypass valve configured to control the amount of fluid flowing through the first fluid bypass;
 a second bypass valve configured to control the amount of fluid flowing through the second fluid bypass; and
 a controller configured to control the first and second heat pump systems and the first and second bypass valves to modulate cooling capacity for the first and second climate controlled systems in accordance with cooling requirements for the first and second climate controlled regions, respectively, wherein the fluid loop enters the first heat pump system at only one inlet and the fluid loop enters the second heat pump system at only one inlet.

2. The thermal management system of claim 1, wherein the first and second climate controlled regions each include one or more load modules.

3. The thermal management system of claim 2, wherein the load modules of the first and second climate controlled regions each include a heat exchanger.

4. The thermal management system of claim 1, wherein the first and second heat pump systems each include one or more heat pump units.

5. The thermal management system of claim 1, wherein the first climate controlled region comprises a galley.

6. The thermal management system of claim 5, wherein the galley includes a plurality of galley carts.

7. The thermal management system of claim 5, wherein the second climate controlled region comprises a recirculation chamber.

8. The thermal management system of claim 1, wherein the first heat pump system is configured to only cool the fluid in the fluid loop, and wherein the second heat pump system is configured to only heat the fluid in the fluid loop.

9. The thermal management system of claim 1, wherein the first and second heat pump systems are configured to only cool the fluid in the fluid loop.

10. The thermal management system of claim 1, wherein the first and second heat pump systems are configured to only heat the fluid in the fluid loop.

11. The thermal management system of claim 1, wherein the fluid is a liquid.

12. The thermal management system of claim 1, wherein the fluid is a gas.

13. The thermal management system of claim 12, wherein the gas is air.

14. The thermal management system of claim 1, wherein the first and second heat pump systems each include a compressor, a condenser, and an evaporator, and the controller is configured to control a speed of each compressor in order to modulate cooling for each of the climate controlled regions.

* * * * *